United States Patent
Celestine et al.

(10) Patent No.: US 11,516,306 B2
(45) Date of Patent: *Nov. 29, 2022

(54) SYSTEMS AND METHODS FOR RESILIENT COMMUNICATION PROTOCOLS AND INTERFACES

(71) Applicant: Express Scripts Strategic Development, Inc., St. Louis, MO (US)

(72) Inventors: Johnu Celestine, Flemington, NJ (US); Surya Teja Reddy Kotha, Maryland Heights, MO (US); Dmitry Milman, Paramus, NJ (US); Robert W. Scanlon, Des Peres, MO (US); Daniel E. Powers, Manchester, MO (US); David Erickson, St. Louis, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,287

(22) Filed: Jan. 17, 2022

(65) Prior Publication Data
US 2022/0141302 A1 May 5, 2022

Related U.S. Application Data

(63) Continuation of application No. 17/078,893, filed on Oct. 23, 2020, now Pat. No. 11,228,656.

(51) Int. Cl.
| | |
|---|---|
| *H04L 67/55* | (2022.01) |
| *G06F 9/54* | (2006.01) |
| *H04L 67/51* | (2022.01) |

(52) U.S. Cl.
CPC .............. *H04L 67/55* (2022.05); *G06F 9/542* (2013.01); *G06F 9/546* (2013.01); *H04L 67/51* (2022.05)

(58) Field of Classification Search
CPC ......... H04L 67/26; H04L 29/08; H04L 67/51; H04L 67/55; H04L 67/05; G06F 9/54; G06F 9/546
See application file for complete search history.

(56) References Cited

U.S. PATENT DOCUMENTS 9,838,377 B1 12/2017 Lander
9,842,045 B2 * 12/2017 Heorhiadi ........... G06F 11/3692
(Continued)

*Primary Examiner* — Sargon N Nano
(74) *Attorney, Agent, or Firm* — Stinson LLP

(57) ABSTRACT

An event processing system is provided for providing resilient message processing using asynchronous communications. The event processing device includes a processor and a memory. The event processing device is in communication with a publisher microservice and subscriber microservices. The processor is configured to receive an event including a collection of data from the publisher microservice. The processor is also configured to process the event to identify a recipient microservice. The processor is configured to update a queue with a queue entry for each of the at least one recipient microservices for the event. Each queue entry is associated with a priority. The processor is also configured to attempt to transmit the event to each of the at least one recipient microservices until a transmission confirmation message is received. The processor is further configured to update the queue by removing the queue entry for which the transmission confirmation message is received.

20 Claims, 7 Drawing Sheets

(56) References Cited

U.S. PATENT DOCUMENTS

| | | | |
|---|---|---|---|
| 10,348,858 B2* | 7/2019 | Theebaprakasam | ........................ G06F 11/3082 |
| 10,445,395 B2 | 10/2019 | Carru | |
| 10,511,589 B2 | 12/2019 | Gangawane | |
| 10,521,284 B2 | 12/2019 | Mcclory | |
| 10,684,940 B1* | 6/2020 | Kayal | ................. G06F 11/3664 |
| 10,735,394 B2 | 8/2020 | Gupta | |
| 10,810,112 B2* | 10/2020 | Rajagopalan | ....... G06F 11/3672 |
| 10,841,392 B2 | 11/2020 | Walsh | |
| 10,866,851 B2* | 12/2020 | Basiri | ................. G06F 11/3466 |
| 10,904,074 B2 | 1/2021 | Wilson | |
| 2006/0080596 A1 | 4/2006 | Bhogal | |
| 2010/0325691 A1 | 12/2010 | Willars | |
| 2017/0329957 A1* | 11/2017 | Vepa | ..................... G06F 21/445 |
| 2017/0331832 A1* | 11/2017 | Lander | .................. H04L 63/102 |
| 2018/0039565 A1* | 2/2018 | Rajagopalan | ....... G06F 11/3476 |
| 2018/0041336 A1 | 2/2018 | Keshava | |
| 2018/0063143 A1 | 3/2018 | Wilson | |
| 2018/0075231 A1* | 3/2018 | Subramanian | ...... H04L 63/0807 |
| 2018/0083977 A1 | 3/2018 | Murugesan | |
| 2019/0044899 A1 | 2/2019 | Hughes | |
| 2020/0007530 A1 | 1/2020 | Mohamad Abdul | |
| 2020/0042365 A1 | 2/2020 | Tanna | |
| 2020/0097247 A1* | 3/2020 | Molina | ................... G06F 3/167 |
| 2020/0145196 A1 | 5/2020 | Lin | |
| 2020/0244638 A1 | 7/2020 | Gupta | |
| 2021/0176326 A1 | 6/2021 | Carley | |
| 2021/0203662 A1* | 7/2021 | Calegari | ............... H04L 63/102 |
| 2022/0067108 A1* | 3/2022 | Roy | ................... G06F 21/6227 |

* cited by examiner

SYSTEMS AND METHODS FOR RESILIENT COMMUNICATION PROTOCOLS AND INTERFACES

CROSS REFERENCE TO RELATED APPLICATIONS

This application is a continuation of U.S. application Ser. No. 17/078,893, which was filed Oct. 23, 2020. The entire disclosure of said application is incorporated herein by reference.

FIELD OF INVENTION

The field relates to architectures for resilient communication protocols and interfaces. More specifically, the field of the invention is related to message broker services in service oriented architectures and microservice architectures.

BACKGROUND OF THE DISCLOSURE

In modern computing environments, microservice architecture ("MSAs") and service oriented architectures ("SOAs") have become increasingly utilized to support operations. These architectures employ a variety of interconnected systems that provide, utilize, and interact with specific, fine-grained applications (or services) that are interconnected by processing engines. A "microservice" is typically considered a highly specific "service". Such architectures are useful because they provide flexibility in design and accommodate continuous delivery models for software development.

Many such SOAs and MSAs include event processor services that are available to a variety of consuming services or microservices ("consumers"). Thus, one set of consumers may initiate a request to such event processors while providing solutions to a different set of consumers (including end users, internal system users, and other microservices) such that the event processors allow the consumers to accomplish or advance a task, step, or event that is important to the consumer by processing the event(s). Such event processors therefore often interact with a wide variety of services and microservices that may have distinct requirements and approaches.

In many cases, users have technical and/or non-technical expectations regarding the ability of consuming services and microservices to keep the users updated about the state of a request, including the remaining time to fulfill the request, any errors or exceptions in fulfilling the request, or whether a request has been or will be retried. But, in many cases standard SOA or MSAs fail to provide tools that allow event processor services (or other downstream services) to inform consumers or users about the state of requests. Thus, in many cases users (including end users) and consumers are left without sufficient updates about the state of their requests. Even more crucially, the failure to provide such updates creates a technical problem because consumers are unable to determine when or whether to report an error or retry a request. In the absence of such updates, a consuming service or microservice cannot determine whether a request is being processed normally, whether an anomaly in processing has occurred, or whether the event processor has failed. Thus, these problems create both technological problems in networks and practical problems for consumers and users.

Accordingly, a solution to these technical problems is desired that can provide resilient communication protocols and message broker services and thereby cause event processor services to interact with consumer services and microservices in a predictable and stable manner.

BRIEF SUMMARY OF THE INVENTION

In one aspect, an event processing system is provided for providing resilient message processing using asynchronous communications. The event processing system includes a publisher microservice, at least one subscriber microservice, and an event processing device. The event processing device includes a processor and a memory. The event processing device is in communication with the publisher microservice and the subscriber microservices. The event processing device includes an events API and a message broker service. The processor is configured to receive, at the events API, an event. The event includes a collection of data from the publisher microservice, wherein the event does not include protected payload data, wherein the event includes access information for making a request for the protected payload data from the publisher microservice. The processor is also configured to process the event to identify a recipient microservice from the subscriber microservices. The processor is further configured to update a queue with a queue entry for each of the at least one recipient microservices for the event. Each queue entry is associated with a priority. The processor is also configured to attempt to transmit the event, including the access information, to each of the at least one recipient microservices until a transmission confirmation message associated with the transmission is received from the at least one recipient microservice, wherein the transmission of the event allows the recipient microservice to make a request for the protected payload data from the publisher microservice. The processor is further configured to update the queue by removing the queue entry for which the transmission confirmation message is received.

In another aspect, an event processing device is provided. The event processing device includes a processor and a memory. The event processing device is in communication with a publisher microservice and subscriber microservices. The event processing device includes an events API and a message broker service. The processor is configured to receive, at the events API, an event. The event includes a collection of data from the publisher microservice, wherein the event does not include protected payload data, wherein the event includes access information for making a request for the protected payload data from the publisher microservice. The processor is also configured to process the event to identify a recipient microservice from the subscriber microservices. The processor is further configured to update a queue with a queue entry for each of the at least one recipient microservices for the event. Each queue entry is associated with a priority. The processor is also configured to attempt to transmit the event, including the access information, to each of the at least one recipient microservices until a transmission confirmation message associated with the transmission is received from the at least one recipient microservice, wherein the transmission of the event allows the recipient microservice to make a request for the protected payload data from the publisher microservice. The processor is further configured to update the queue by removing the queue entry for which the transmission confirmation message is received.

In yet another aspect, a method is provided for providing resilient message processing using asynchronous communications. The method is performed by an event processing device including a processor and a memory. The event processing device is in communication with a publisher microservice and subscriber microservices. The event processing device includes an events API and a message broker service. The method includes receiving, at the events API, an event comprising a collection of data from the publisher microservice, wherein the event does not include protected payload data, wherein the event includes access information for making a request for the protected payload data from the publisher microservice. The method also includes processing the event to identify at least one recipient microservice from the at least one subscriber microservices. The method further includes updating a queue with a queue entry for each of the at least one recipient microservices for the event, wherein each queue entry is associated with a priority. The method additionally includes attempting to transmit the event, including the access information, to each of the at least one recipient microservices until a transmission confirmation message associated with the transmission is received from the at least one recipient microservice, wherein the transmission of the event allows the recipient microservice to make a request for the protected payload data from the publisher microservice. The method also includes updating the queue by removing the queue entry for which the transmission confirmation message is received.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

DETAILED DESCRIPTION

Figure 1:
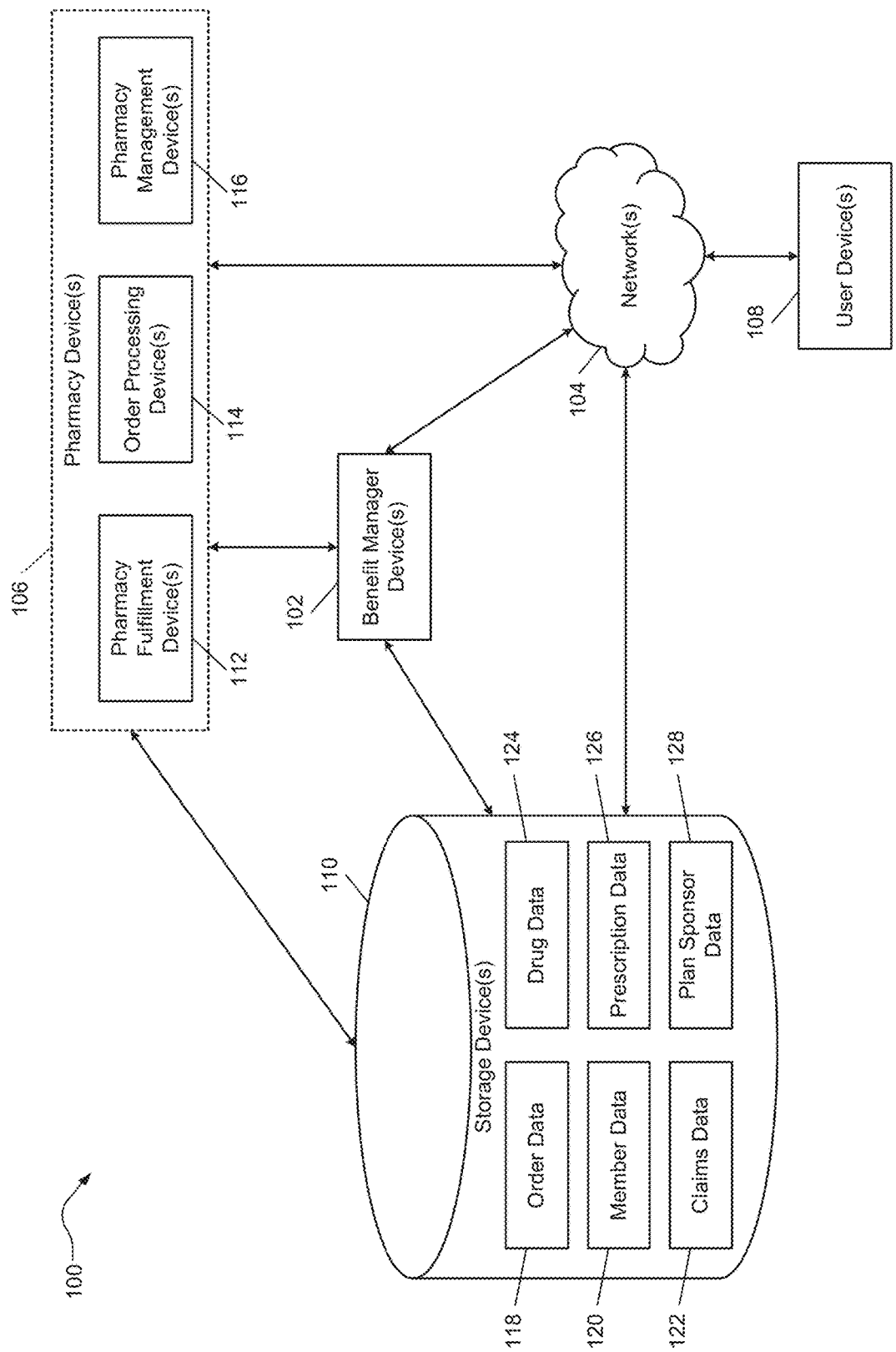
FIG. 1 is a functional block diagram of an example system including a high-volume pharmacy.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

As used herein, the term "service oriented architecture" or "SOA" refers to a style of software design in which services are provided to other components using application components, through a communication protocol used over a network. Accordingly, an SOA "service" is a discrete unit of functionality that can be accessed remotely and acted upon and updated independently, such as transmitting a request to process an order for fulfillment. SOA is often independent of vendors, products and technologies. Typically, an SOA service has four properties. First, an SOA service typically logically represents a business activity with a specified outcome. Second, an SOA service is typically self-contained. Third, an SOA service is often a "black box" to its consumer services (and users), meaning the consumers are often unaware of the operation and status of the service. Fourth, an SOA service typically may consist of other underlying services.

As used herein, the term "microservice architecture" refers to a variation on service oriented architecture wherein the services of the software design are not tightly integrated, allowing for alterations, removals, or additions of services within the same architecture. Some defining characteristics of microservice architectures ("MSAs") include the following: First, services in a microservice architecture (MSA) are often processes that communicate over a network to fulfil a goal using technology-agnostic protocols such as hypertext transfer protocol ("HTTP"). Second, often services are organized around business capabilities. Third, services can be implemented using different programming languages, databases, hardware and software environment, depending on what fits best. Fourth, services are small in size, messaging-enabled, bounded by contexts, autonomously developed, independently deployable, decentralized and built and released with automated processes. For this reason, MSAs often include microservices that present as "black boxes", like their equivalents in SOAs.

As used herein, the term "message broker service" or "message broker" is an intermediary computer program module that translates a message from the formal messaging protocol of the sender to the formal messaging protocol of the receiver. Message broker services are elements in telecommunication or computer networks where software applications communicate by exchanging formally-defined messages. Message broker services are a building block of message-oriented middleware (MOM) and may be utilized in SOAs and MSAs.

As explained above, despite the advantages of such SOAs and MSAs, these architectural models have deficiencies. Most notably, the fact that services or microservices are opaque to other services or microservices (or "blackboxed") prevents consumers and users from access to internal workings of the services or from getting updates regarding requests made to services or microservices. As a practical matter, services and microservices may become temporarily unavailable, unresponsive, or behave anomalously at times, which may make request processing fail or be delayed. Due to the "black box" effect, in many cases consumers and users only receive updates after a request has failed, if at all. In systems that process high transaction volumes, such updates may only come via batch processing. Thus, failure statuses may be received long after an underlying failure occurs. Further, in many such cases, a human user is required to take actions to make a new request to the service. From a technical perspective, the approach leads to great inefficiency. Further, in many examples, message broker services provide the same processing services for all upstream and downstream (micro)services. However, in many cases each (micro)service has specific requirements for message routing and handling, processing, and timing. Thus, the inability of message broker services to process messages (or events) distinctly for distinct consumers and users prevents technical requirements from being met. As described herein, messages or events are a collection of data (e.g., a packet) including at least a name, definitional attributes (described below), and a payload (i.e., the core information that is shared between (micro)services).

In at least some examples, (micro)services are configured to provide "lightweight" messages or events that do not include payload data. Instead, as explained in more detail below, in some such examples publisher (micro)services are configured to provide access to payload data to subscriber (micro)services after a message or event is routed and received by the subscriber (micro)services. In such examples, the publisher (micro)service routes a message (or event) to the events platform which updates the message as necessary (including adding timestamps), updates a queue, and conveys the message to necessary subscribers. The event includes information to identify the publisher (micro) service to the subscriber (micro)service. The subscriber (micro)service uses the event information to identify the location of the publisher (micro)service and makes a direct connection to the publisher (micro)service (using, for example, a representational state transfer ("REST") connection). In one example, the subscriber (micro)service identifies the publisher (micro)service to connect to based on the event type included in the event. In another example, the subscriber (micro)service identifies the publisher (micro) service to connect to based on a recorded publisher identifier included in the event.

The subscriber (micro)service then requests the payload associated with the event or message by providing access information. The access information may include providing the received event itself, or data from the event. The publisher (micro)service is configured to confirm that the subscriber (micro)service is authorized to receive the payload based on the access information. To accomplish this step, in at least one example the publisher (micro)service receives an updated event from the events platform (including a timestamp), after initially transmitting the event to the platform. In such an example, the publisher (micro)service may confirm that unique resource identifiers and timestamps provided by the requesting subscriber (micro)service, via the access information, matches the known resource identifiers and time stamps from the previously received events. Upon such confirmation, the publisher (micro)service provides payload data. This approach may be used to protect sensitive payload data including to protect confidential or personal information such as protected health information ("PHI") or personally identifying information ("PIP"). This approach is also beneficial for reducing the amount of data transmitted through the events platform, thereby improving communication efficiency. In some examples, this approach may also be used to protect other forms of information or to provide data security for users and consumers.

The systems and methods described herein provide technical solutions to these technological problems by providing resilient communication protocols, application programmer interfaces, and message broker services that allow event processor services to interact with consumer services and microservices in a predictable and stable manner. Specifically, the systems include an events application programmer interface ("events API") that ensures message delivery using a message broker service included within the events API. Message delivery is thus ensured even in conditions where a downstream service or microservice is unresponsive, performing anomalously, or is unavailable. The events API and message broker service also allow for communication and message (or event) handling protocols to be defined specific to particular requestors (e.g., services or microservices) and particular recipients. Through the use of these technologies, the systems and methods described overcome the technological problems in MSAs and SOAs. Because the solutions involve a novel events API and message broker service, such solutions are necessarily rooted in computer technology and in computer networking. The events API and message broker service functionally provide asynchronous communication services with loose coupling to the upstream and downstream (micro)services.

In an example embodiment, an event processing platform for providing resilient event processing using asynchronous communications is provided. The event processing platform includes a plurality of microservices, an events application programmer interface ("events API"), and a message broker. (In some examples, the event processing platform includes a plurality of services instead of or in addition to the plurality of (micro)services. As described herein, the events API may therefore function in MSA environments, SOA environments, or combinations thereof. Likewise, the event processing platform is provided to function within an MSA environment, an SOA environment, combinations thereof, or any similar system architectural environment.) The (micro) services are configured to run using associated (micro) service devices. The microservice devices are physical servers or virtual servers that are each configured to run at least one (micro)service. The microservice devices therefore include physical or virtual components necessary to provide these functions including at least a processor, a memory, a communication interface(s), and any necessary inputs and outputs.

As described herein, the (micro)services are each configured to provide at least one application in the context of the MSA and/or SOA. The applications provided may be any possible application service that is used in an MSA and/or SOA environment. In one example, an MSA is used to support a high-volume pharmacy. In this example, the MSA may include (micro)services that provide applications for order management, order processing, order fulfillment, prescription management, prescription processing, shipping, financial processing, account enrollment, and account management. In short, the (micro)services are used to provide any applications or functions necessary for the technical or business requirements of an environment.

The events API is configured to run using an events API server that manages communication to and from the events API and the functions of the events API using the message broker service. The events API server is a physical server or a virtual server that includes physical or virtual components necessary to provide the functions of the events API. The events API server includes at least a processor, a memory, a communication interface(s), and any necessary inputs and outputs. The message broker service may be implemented in the events API server or in a separate physical server or a virtual server that includes physical or virtual components necessary to provide the message broker functions described below. In such implementations, the message broker service device includes at least a processor, a memory, a communication interface(s), and any necessary inputs and outputs, and the message broker service device is in communication with the events API server. In all implementations, the events API, message broker service, and microservices (or services) are in networked communication with one another.

In an example embodiment, the message broker service guarantees at least one delivery of a message that it is requested by a requestor to send to a recipient. The message broker service thus guarantees communication of the message even when the recipient (micro)service is temporarily or intermittently down. To accomplish this result, in one example, the message broker service implemented using a queue that manages pending messages and ensures delivery. (In other examples, other suitable data structures may be used in lieu of a queue.) The message broker service is implemented using a queue into which each requested message is added. To invoke the events API to transmit a message, a requestor sends the events API a message. In many examples, the message broker service responds to the (micro)service requestor with a receipt confirmation message such as an HTTP 200 ("OK") message, or an equivalent messages under other messaging protocols.

The events API updates the queue with information regarding the message including a queue priority (or order) and a timestamp of receipt. In many examples, the events include timestamps that reflect the time that the publisher (micro)service sent the event or message. (Such information may be reflected in metadata provided with the event or message.) In other examples, the events API tracks the time that the event or message is received and a timestamp is entered as a timestamp of receipt. As described below, such timestamps may be used to prioritize the processing of events or messages from within the message queue. In at least one example, if multiple events have both the same sent timestamp values and the same unique resource identifier, the events platform is configured to determine that such events are duplicative. In at least some cases, all but one of the duplicated events are purged and the remaining non-duplicate event is processed.

The queue may also include additional information regarding the message. In some examples, the events API is configured to handle messages in a specific manner such that distinct particular protocols may be defined for particular recipients or requestors. The message broker server selects a group of messages from the queue based on the queue priorities of each of the selected group. In some examples, the selected group may include the highest priority message(s). In one example, one highest priority message is selected while in another, the selected group includes two, three, or four messages. In another example, the highest priority messages are those that remain in the queue after a failed attempt to transmit the message to a subscriber(s) (micro)service(s). That is to say the highest priority messages are those that the events platform is "retrying" to send.

The message broker service sends the message to a receiving (micro)service until the message is delivered successfully. The message broker service determines that the message has been delivered successfully when the receiving (micro)service (alternately referred to as the "consuming (micro)service") sends back a transmission confirmation message. In some examples, the transmission confirmation message is an HTTP 204 (no content) message, or an equivalent messages under other messaging protocols. After receiving the transmission confirmation message, the message broker service updates the queue (or equivalent data structure) to remove the message that is confirmed to be received. That is to say, only after confirmation of successful delivery does the message broker service update the queue to remove the formerly pending, now transmitted message. In one example, the transmission confirmation message is an indication that the receiving (micro)service has received the message and may attempt to process it, but is not an indication that the receiving (micro)service can or has successfully processed the message. In such an example, the receiving (micro)service therefore separately processes the message after receipt (and transmitting the transmission confirmation message). If the message is successfully processed, the receiving (micro)service may transmit a processing result message to the message broker service which takes no further action in one example. If the message is not successfully processed, the receiving (micro)service may transmit a processing result message to the message broker service which may then report the processing failure to the requesting (micro)service which may inform an upstream user or service and/or submit a retry message.

In a second example, the transmission confirmation message is an indication that the receiving (micro)service has received and processed the message and therefore the queue is only updated when the message broker service has received confirmation of receipt and processing. As described herein, the receipt confirmation messages and the transmission confirmation messages partially address the technical problem related to "blackboxing" in MSAs and SOAs by ensuring that event processing does not render upstream consumers (e.g., publisher (micro)services) unaware of the status of downstream processing.

In some examples, the events API and the message broker service may be collectively referred to as an "events platform". In an example embodiment, the events platform (and its component elements) is utilizes the hypertext transfer protocol ("HTTP") and may be said to be HTTP-based. As described herein, the events platform is in communication with (micro)services. In an example embodiment, the (micro)services enroll with the events platform in order to establish a relationship with the events platform. Enrollment includes defining the communication protocol for events between the enrolled (micro)services (whether downstream or upstream) and the events platform, including defining the components of events (or messages), routing rules, retry rules, and business logic. In some examples, the events platform is associated with a user interface that allows a user to define enrollment information, including for particular subscribers, publishers, or event types. The events platform provides asynchronous communications from upstream consumers (or publishers) and downstream consumers (or subscribers) so that the events platform may provide "many-to-many" communications between publishers and subscribers. Because the events platform ensures delivery of events at least once (using the queueing model described above), the events platform may be described as durable or resilient, allowing for events to be transmitted downstream from publisher to subscriber even when a given subscriber is temporarily unavailable. Further, the events platform supports multi-tenancy and allows for (micro)services to subscribe or publish events specific to their tenancy (using, e.g., a particular tenancy identifier).

Within the events platform, the events API allows upstream consumers (publishers) to submit (or post) events that the events platform (via the message broker service) transmits to downstream consumers (subscribers) after updating the queue. On receipt of each event, in addition to transmitting a receipt confirmation messages, the events platform may update the event with additional definitional attributes including a timestamp (e.g., a UNIX timestamp represented in milliseconds from a predetermined date indicating the time of transmission of the event by the publisher (micro)service or receipt of the event by the events API). The timestamp may also be provided by logical clocks. In some examples, a timestamp from a logical clock may allow a publisher micro(service) or other micro(service) to specify prioritization, sequencing, and/or use. Logical clocks may be beneficial to allow for distributed systems in multiple locations or instances.

In most examples, the event includes a resource identifier determined by the publisher (micro)service and provided with the event when it is sent to the events platform. In some examples, the unique resource identifier may be generated by the events platform. As indicated, the unique resource identifier is created to allow for unique identification of the event and for subsequently facilitating access of actionable protected payload data to subscriber (micro)services from publisher (micro)services. In some embodiments, the events platform returns the updated event to the upstream consumer (publisher) to allow the publisher to have record of the resource identifier and timestamp.

In most embodiments, the events typically include the following definitional attributes: 1. A resource identifier as defined above, typically determined by the publisher (micro) service; 2. A timestamp as defined above, typically generated by the events platform based on the time of the sending of the event from the publisher (micro)service or the time of receipt of the event by the events platform; 3. An identifier such as a prefix or suffix representing or identifying the (micro)service that generated the event, which is typically the publisher (upstream consumer); 4. An identifier of the type of the event; 5. A tenant identifier indicating the tenant to which the event is assigned; and 6. Properties for customized events represented as name/value pairs. The process of customizing event data is described immediately below.

The message broker service also allows customization for particular events (or messages) associated with particular requestors and recipients. For example, the message broker service may be updated to expect particular information with events for a given event type (or other event definitions), to identify non-conforming events as anomalous, and sent a response indicating the request is anomalous (e.g., an HTTP 400 ("bad request") response). Such customization also allows the message broker service to define custom routing specific to particular events based on their attributes.

Downstream consumers (subscribers), like upstream consumers (publishers), enroll to set a communications protocol with the events platform and the message broker service. Accordingly, downstream consumers (subscribers) implement a service to receive events from the events platform via, for example, a subscriber API which receives events per the specific event rules for the event type and/or publisher (micro)service. Likewise, upstream consumers (publishers), develop a messaging protocol that allows for events transmission to the events platform per the specific event rules for the event type and subscriber (micro)service. The events platform sends the event (updated, as necessary, with any new elements including resource identifiers, receipt or transmission timestamps, tenant identifiers, and property identifiers) posting the event to any subscriber identified by the message broker service based on routing rules including rules specific to the event. The subscriber(s) respond to the events platform with a transmission confirmation, as described above. As described above, in a first example, the transmission confirmation message is an indication that the receiving (micro)service has received the message and may attempt to process it, but is not an indication that the receiving (micro)service can or has successfully processed the message. In such an example, the receiving (micro) service therefore separately processes the message after receipt (and transmitting the transmission confirmation message). In this example, subscribers are configured (based on enrollment) to perform no or minimal processing prior to sending the transmission confirmation message to the events platform (and events API). In such an example, subscribers preferably respond within one (1) second, or the transmission confirmation message may be identified as delayed. In some cases, an indication of delay is listed in the transmission confirmation message and provided back to the events platform. Such indication delay may be used to prioritize future events amongst possible subscribers.

In one embodiment, the event is transmitted from the events platform with particular definitional attribute fields for subscribers (added by the events platform) including at least: 1. A subscriber name identifier specific to each subscriber; and 2. An event unique identifier. The event unique identifier corresponds to the event unique identifier provided to the upstream consumer (publisher). As noted above, in some examples, a transmission confirmation message is sent from the subscriber to the events platform. The transmission conformation message may be an HTTP 204 (no content) message, or an equivalent messages under other messaging protocols. In some embodiments, the transmission confirmation message is a non-null, non-zero length response determined at enrollment. In some examples, the publisher, subscriber, or events platform may transmit suitable error codes. In such examples, the entity that receives the error code will typically treat the error as indicating that a prior communication was unsuccessful, and the entity will retry transmission of an event (or message). Errors are also entered into logs files on the API platform.

To recapitulate the above, the event platform processes an event as follows. First, all (micro)services enroll with the events platform and thereby define the definitions for events (including any optional properties, business logic, routing rules, or retry rules). An upstream consumer (publisher) sends an event (or "publishes" an event) to the event platform. The events platform receives the event and the event is stored in a memory associated with the events platform. The events platform also creates a queue record associated with the event. The events platform responds to the upstream consumer (publisher) with a receipt confirmation message that may include an HTTP 200 ("OK") message, or an equivalent messages. The events platform may also update the received event with definitional attributes including a receipt or transmission timestamp. The event also typically contains a unique resource identifier defined by the publisher (micro)service. Because the timestamp may reflect the time that the publisher (micro)service transmits the event, the timestamp may be referred to as a "transmission timestamp" or a "sent timestamp". In many examples, the timestamps are used to prioritize the processing of events or messages from within the message queue. As a result, the publisher (micro)services may functionally facilitate asynchronous communication because the transmission timestamp may allow the publisher to determine which events receive priority.

As such, the examples in which the timestamps are transmission timestamps or sent timestamps allow the publisher (micro)service to relatively determine the prioritization of event processing because the publisher (micro) service defines the timestamp. Further, the examples in which the timestamps are received timestamps or receipt timestamps allow the events platform to relatively determine the prioritization of event processing. The events platform may also respond to the publisher by transmitting the updated event back to the publisher. Based on the business logic, event and event definitions, and enrollment events, the events platform routes the updated event to at least one subscriber. The events platform retries sending the event on a periodic basis until it receives a transmission confirmation message from the subscriber(s). In one example, the transmission confirmation message is provided as a message with an HTTP 200 status code and/or success messages in the body of the message. The events platform is accordingly configured to process transmission confirmation message by validating that the message indicates that the underlying event successfully processed, and accordingly updating the queue.

As described herein, the events platform may route in a "many-to-many" model and thus may route event from one publisher to one subscriber, one publisher to multiple subscribers, or multiple publishers to multiple subscribers. Where one event is routed to multiple subscribers, the event and/or enrollment definitions define such a routing. Further, the events platform maintains a queue specific to each routing event meaning that the queue is written for each event and for each subscriber such that a given event may be associated with multiple queue entries (for each intended subscriber). The queue is thus decremented as each subscriber responds. In normal conditions (i.e., wherein subscribers and publishers are behaving normally), the events platform sends an event to each intended subscriber exactly once because no retries are needed. Where a subscriber is intermittently unavailable, unresponsive, or communication networks are not functioning, the events platform retries (at a predefined rate) until a transmission confirmation message is received from the intended subscriber. Thus the events platform may attempt to deliver an event multiple times where anomalous conditions exist. Likewise, under some conditions, the events platform provides events to subscribers in the order that they were published (absent any other prioritization rules). However, because the events platform may be deployed on multiple nodes and using multi-tenancy, parallel processes are used to route the events to subscribers. Further, the disclosed architecture may be implemented on distributed systems. As a result, events may be delivered asynchronously but the actual time of publication is persisted in the event.

In one example, any failure by the events platform to deliver an event to a subscriber will result in a retry including timeout, receipt of an error message from a subscriber, and receipt of a failure message from a subscriber. In one embodiment, the events platform attempts to retry event transmission until it receives a transmission confirmation message. In a second model, the events platform attempts to retry event transmission for a defined period of attempts or time before abandoning event transmission and reporting an error to a user.

As described herein, in at least some examples, (micro) services are configured to provide "lightweight" messages or events that do not include payload data which are then processed through the events platform. Instead, as explained in more detail below, in some such examples publisher (micro)services are configured to provide access to payload data to subscriber (micro)services after a message or event is routed and received by the subscriber (micro)services. In such examples, the publisher (micro)service routes a message (or event) to the events platform which updates the message as necessary (including adding timestamps), updates the queue, and conveys the message to necessary subscribers. The event includes information to identify the publisher (micro)service to the subscriber (micro)service. The subscriber (micro)service uses the event information to identify the location of the publisher (micro)service and makes a direct connection to the publisher (micro)service (using, for example, a representational state transfer ("REST") connection). In the example embodiment, the publisher (micro)service and subscriber (micro)service have their own APIs and the connection is made using such APIs. The subscriber (micro)service then requests the payload associated with the event or message by providing access information. The access information may include providing the received event itself, or data from the event. The publisher (micro)service is configured to confirm that the subscriber (micro)service is authorized to receive the payload based on the access information. To accomplish this step, in at least one example the publisher (micro)service receives an updated event from the events platform (including a timestamp), after initially transmitting the event to the platform. In such an example, the publisher (micro)service may confirm that unique resource identifiers and timestamps provided by the requesting subscriber (micro)service, via the access information, matches the known resource identifiers and time stamps from for the events. Upon such confirmation, the publisher (micro)service provides payload data. This approach may be used to protect sensitive payload data including to protect confidential or personal information such as protected health information ("PHI") or personally identifying information ("PII"). This approach is also beneficial for reducing the amount of data transmitted through the events platform, thereby improving communication efficiency. In some examples, this approach may also be used to protect other forms of information or to provide data security for users and consumers.

In some such examples, the systems are configured to identify confidential or protected information by scanning for PII or PHI information. For example, the publisher (micro)services may scan data used to generate an event before creating the event and determine that PHI or PII data is present, and send the associated event without a payload to protect such information. In other examples, a particular publisher may always send events without payloads because PHI or PII data is often included in payload data. In further examples, data used to generate events and payloads may include fields to identify whether protected or confidential information is present and/or whether events should be generated without payloads. In such examples, the (micro) service publisher defines the message based on such conditions and may selectively not include payloads. In other examples, the (micro)service publisher defines the message based on such conditions and may selectively ensure that the event is free from actionable protected payload data. As used herein, "actionable protected payload data" or "protected payload data" is any information that may include protected information (including PHI data, PII data, or other confidential information) as determined by a publisher (micro) service. In one example related to the high-volume pharmacy systems described herein, an event related to a pharmaceutical order is generated by an order (micro) service without any PHI data or PII data related to a client (or patient) and provided to the events platform. The order event therefore is submitted with a unique resource identifier and other necessary event data exclusive of protected payload data. In one example, the event data is created with an indication that protected payload data is not present in the event data including, for example, a flag or a numeric indicator. The events platform processes the order event and identifies a subscriber (micro)service that provides downstream services. The subscriber (micro)service determines that the event is free from actionable protected data and identifies the publisher (micro)service based on the information in the event including, for example, the event type or an event publisher identifier. The subscriber (micro)service makes a connection (via, e.g., a REST connection) to the publisher order (micro)service using any suitable interface (including, e.g., a publisher (micro)service API) to request access to the protected payload data. The publisher (micro) service may analyze the access information (including the unique resource identifier provided in the event to the subscriber (micro)service, which may be used in the request for access) and compare the access information to authentication information available to the publisher (micro)service. In other examples, the access information may include an event type provided by the subscriber (micro)service to confirm that the subscriber (micro)service is associated with a suitable event type that would allow access to the actionable protected payload data. The access information may also include a tenant identifier identifying the subscriber (micro)service, which publisher (micro)service may compare to a list of known valid tenants. This approach may allow the publisher (micro)service to maintain fine-grained control over access to actionable protected payload data. In other examples, any other event data may be used to make a request for payload data, and may be used by a publisher (micro)service to validate such a request. Thus, the publisher (micro)service may maintain records of resource identifiers, prefixes, suffixes, event types, and tenants that may associate with events received by subscriber micro(services) who may be entitled to access such actionable protected payload information.

Thus, in such examples, a subscriber (micro)service may be configured to receive a "lightweight" event and determine that a payload is absent. The subscriber (micro)service identifies the publisher (micro)service associated with the event and makes a request for the payload, including access information. The publisher (micro)service confirms that the access information is consistent with access information the publisher (micro)service has retained from prior communications with the events platform and provides such payload data upon confirmation. If the confirmation fails, the publisher (micro)service may send an error or an alert.

Generally, the systems and methods described herein are configured to perform at least the following steps: receive, at the events API, an event comprising a collection of data from the publisher microservice, wherein the event does not include protected payload data, wherein the event includes access information for making a request for the protected payload data from the publisher microservice; process the event to identify at least one recipient microservice from the at least one subscriber microservices; update a queue with a queue entry for each of the at least one recipient microservices for the event, wherein each queue entry is associated with a priority; attempt to transmit the event, including the access information, to each of the at least one recipient microservices until a transmission confirmation message associated with the transmission is received from the at least one recipient microservice, wherein the transmission of the event allows the recipient microservice to make a request for the protected payload data from the publisher microservice; update the queue by removing the queue entry for which the transmission confirmation message is received; transmit a receipt confirmation message to the publisher upon receiving the event; receive enrollment definitions from the publisher and each subscriber microservice; identify routing rules based on the enrollment definitions; process the event to identify at least one recipient microservice from the at least one subscriber microservices based at least partially on the routing rules; identify a set of required definitional attributes associated with the publisher microservice and the subscriber microservices; validate the received event includes the set of required definitional attributes; process the event if the received event is validated; update the event to include at least a timestamp; update the queue with the queue entry for each of the at least one recipient microservices for the event, wherein the priority is at least partially determined based on the timestamp; identify a maximum number of event transmission attempts; attempt to transmit the event to each of the at least one recipient microservices until a transmission confirmation message associated with the transmission is received from the at least one recipient microservice; determine that the maximum number of event transmission attempts has been met; wait a predetermined period before continuing to attempt to transmit the event; process the event to identify a group of recipient microservice from the at least one subscriber microservices; and attempt to simultaneously transmit the event to each of the group of recipient microservices.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfilment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the use of the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
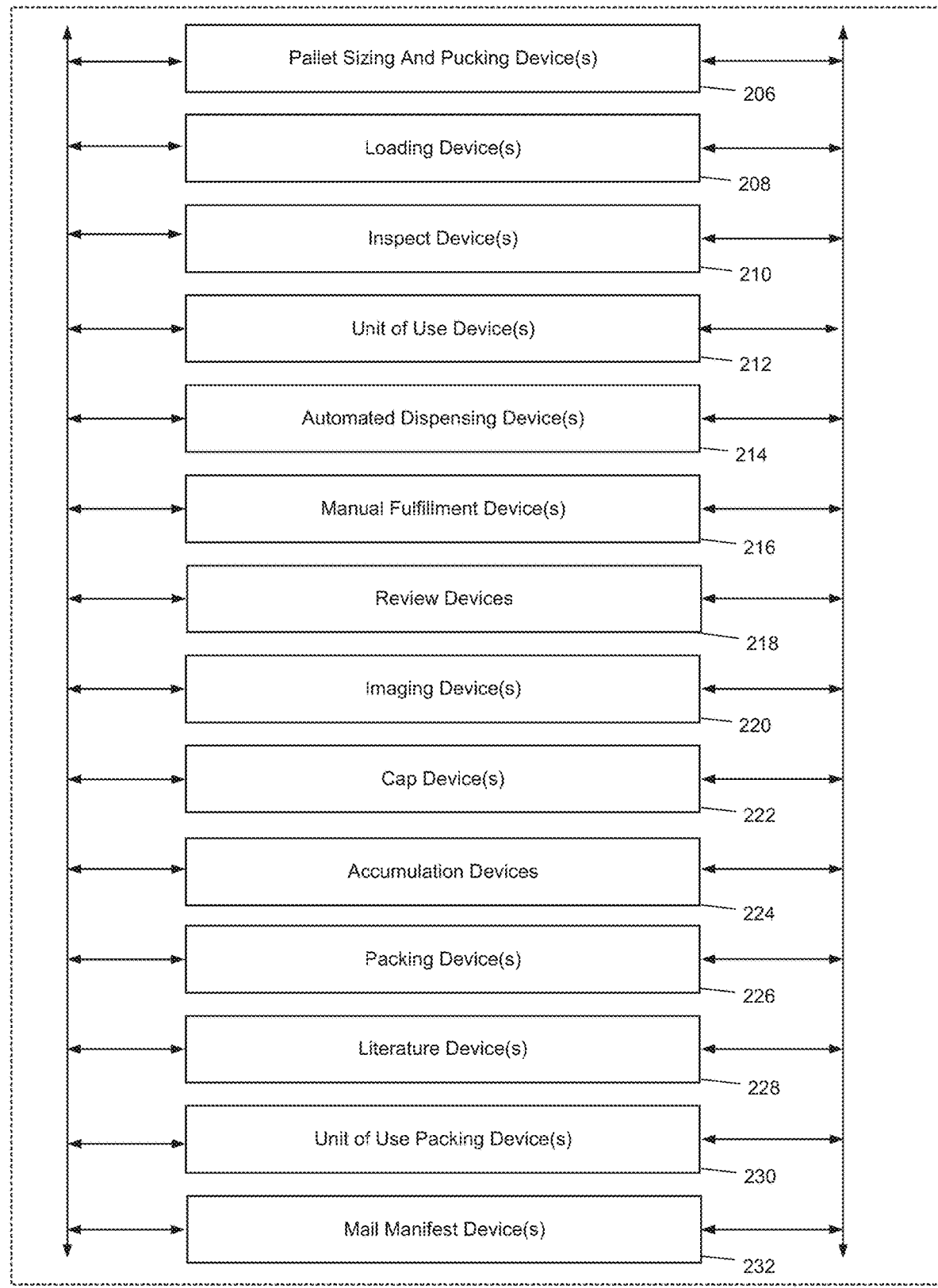
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
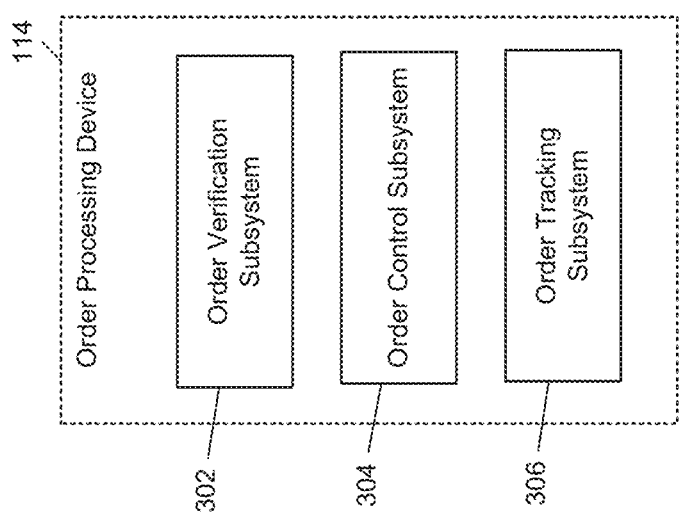
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may include order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Figure 4:
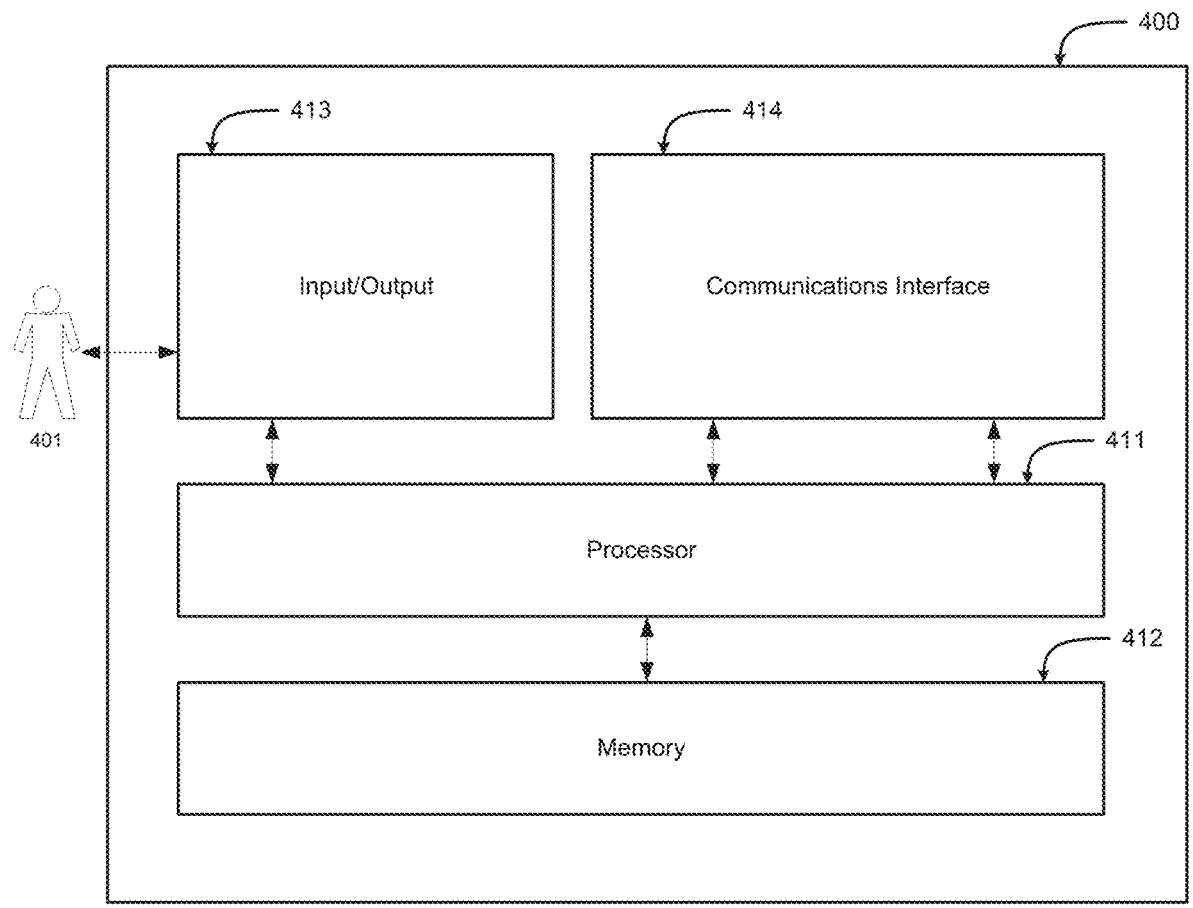
FIG. 4 is a functional block diagram of an example computing device that may be used in the environments described herein.

FIG. 4 is a functional block diagram of an example computing device 400 that may be used in the environments described herein. Specifically, computing device 400 illustrates an exemplary configuration of a computing device. Computing device 400 illustrates an exemplary configuration of a computing device operated by a user 401 in accordance with one embodiment of the present invention. Computing device 400 may include, but is not limited to, a (micro)service server, an event processing server, and an event processing device. Computing device 400 may also include pharmacy devices 106 including pharmacy fulfillment devices 112, order processing devices 114, and pharmacy management devices 116, storage devices 110, benefit manager devices 102, and user devices 108 (all shown in FIG. 1), mobile computing devices, stationary computing devices, computing peripheral devices, smart phones, wearable computing devices, medical computing devices, and vehicular computing devices. Alternatively, computing device 400 may be any computing device capable of performing the event processing methods for providing resilient message processing using asynchronous communications described herein. In some variations, the characteristics of the described components may be more or less advanced, primitive, or non-functional.

In the exemplary embodiment, computing device 400 includes a processor 411 for executing instructions. In some embodiments, executable instructions are stored in a memory area 412. Processor 411 may include one or more processing units, for example, a multi-core configuration. Memory area 412 is any device allowing information such as executable instructions and/or written works to be stored and retrieved. Memory area 412 may include one or more computer readable media.

Computing device 400 also includes at least one input/output component 413 for receiving information from and providing information to user 401. In some examples, input/output component 413 may be of limited functionality or non-functional as in the case of some wearable computing devices. In other examples, input/output component 413 is any component capable of conveying information to or receiving information from user 401. In some embodiments, input/output component 413 includes an output adapter such as a video adapter and/or an audio adapter. Input/output component 413 may alternatively include an output device such as a display device, a liquid crystal display (LCD), organic light emitting diode (OLED) display, or "electronic ink" display, or an audio output device, a speaker or headphones. Input/output component 413 may also include any devices, modules, or structures for receiving input from user 401. Input/output component 413 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 413. Input/output component 413 may further include multiple sub-components for carrying out input and output functions.

Computing device 400 may also include a communications interface 414, which may be communicatively coupleable to a remote device such as a remote computing device, a remote server, or any other suitable system. Communication interface 414 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 414 is configured to allow computing device 400 to interface with any other computing device or network using an appropriate wireless or wired communications protocol such as, without limitation, BLUETOOTH®, Ethernet, or IEE 802.11. Communications interface 414 allows computing device 400 to communicate with any other computing devices with which it is in communication or connection.

Figure 5:
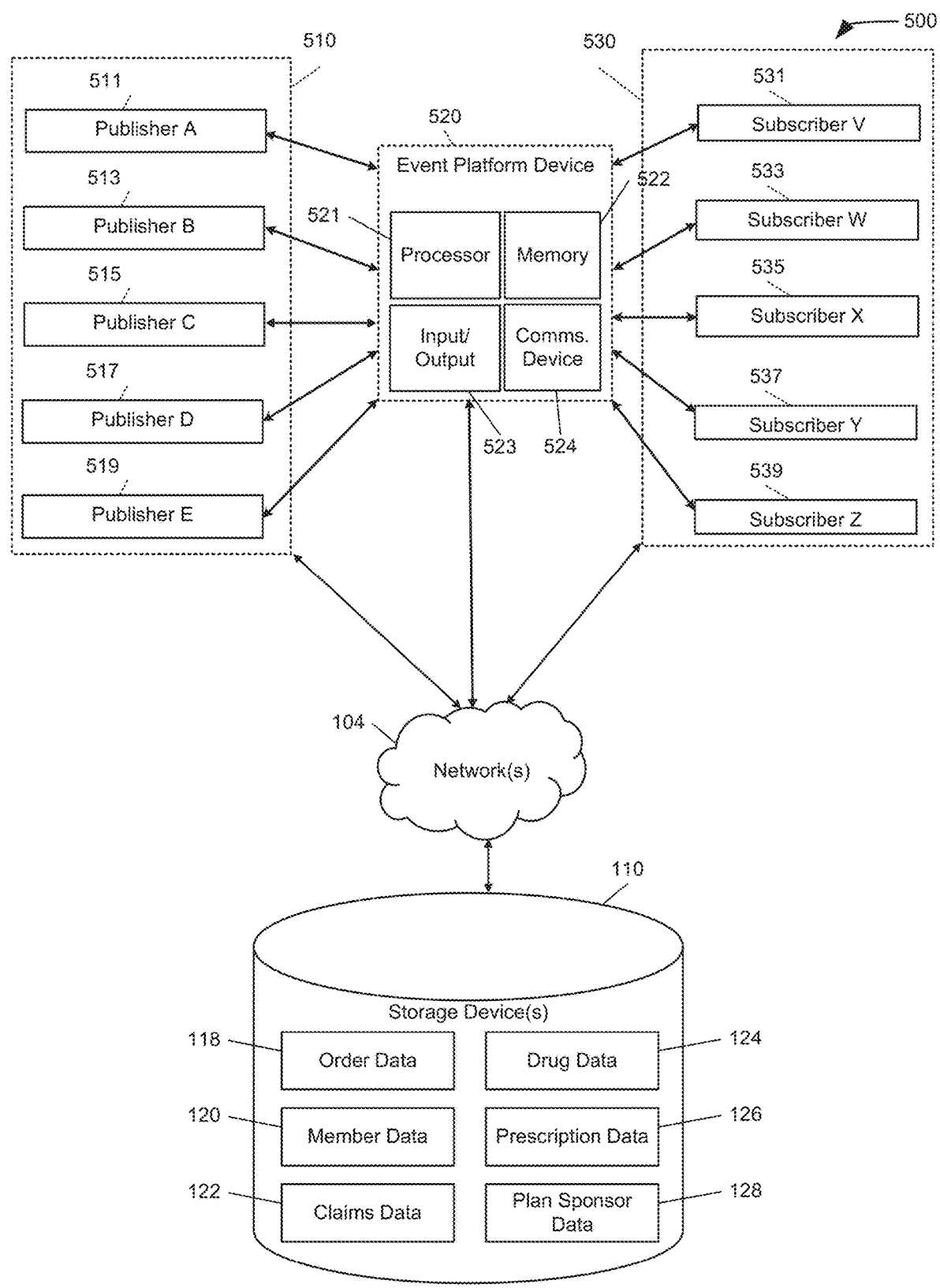
FIG. 5 is a functional block diagram of an event processing system including multiple computing devices shown in FIG. 4.

FIG. 5 is a functional block diagram of an event processing system 500 including multiple computing devices similar to computing device 400 (shown in FIG. 4). As described herein, an event processing system 500 is provided for resilient message processing using asynchronous communications. Event processing system 500 includes a collection 510 of publisher (micro)services 511, 513, 515, 517, and 519, an event platform device 520 (also referred to as an event platform server), and a collection 530 of (micro)services 531, 533, 535, 537, and 539. The number of (micro)services available in an event processing system 500 may vary significantly and FIG. 5 provides one illustration of five publishers and five subscribers using event platform device 520. However, in many embodiments various numbers of publishers and subscribers may be used. Generally, event processing system 500 facilitates "many-to-many" communications, but there may be one or more publishers and one or more subscribers. The (micro)services are implemented on virtual or physical devices (not shown) that provide functionality similar to computing device 400. The (micro)services provided may include any suitable application for a particular environment. In the example embodiment, the (micro)services are configured to facilitate the functions of system 100 (shown in FIG. 1) for a high volume pharmacy. As such, (micro)services have access to system 100 via network 104 and the related information stored in storage device 110.

Event platform device 520 includes a processor 521, a memory 522, an input/output 523, and a communications device 524. Event platform device 520 is configured to provide the functions described herein including providing an events API and a message broker service. Event platform service 520 is further configured to provide the event processing services described herein including enrolling publishers 511, 513, 515, 517, and 519 and enrolling subscribers 531, 533, 535, 537, and 539. Event platform device 520 (and, specifically, processor 521) is configured to receive, at the events API, an event comprising a collection of data from the publisher (micro)services 511, 513, 515, 517, and/or 519, wherein the event does not include protected payload data, wherein the event includes access information used to allow the at least one recipient (micro)service 531, 533, 535, 537, and/or 539 to request protected payload data from the publisher (micro)service 511, 513, 515, 517, and/or 519. Processor 521 is further configured to process the event to identify at least one recipient (micro)service from the at least one subscriber (micro)services 531, 533, 535, 537, and/or 539. Processor 521 is also configured to update a queue with a queue entry for each of the at least one recipient (micro)services 531, 533, 535, 537, and/or 539 for the event, wherein each queue entry is associated with a priority. Processor 521 is further configured to attempt to transmit the event to each of the at least one recipient (micro)services 531, 533, 535, 537, and/or 539 until a transmission confirmation message associated with the transmission is received from the at least one recipient (micro)service 531, 533, 535, 537, and/or 539, wherein the transmission of the event allows the recipient microservice to make a request for the protected payload data from the publisher microservice. Processor 521 is also configured to update the queue by removing the queue entry for which the transmission confirmation message is received.

In some examples, processor 521 is configured to transmit a receipt confirmation message to the publisher 511, 513, 515, 517, and/or 519 upon receiving the event.

Processor 521 is also configured to receive enrollment definitions from publisher 511, 513, 515, 517, and/or 519 and each subscriber (micro)service 531, 533, 535, 537, and/or 539. Processor 521 is further configured to identify routing rules (to determine which subscribers 531, 533, 535, 537, and/or 539 receive events) based on the enrollment definitions. Processor 521 is further configured to process the event to identify at least one recipient (micro)service from the at least one subscriber (micro)services 531, 533, 535, 537, and/or 539 based at least partially on the routing rules.

Processor 521 is also configured to identify a set of required definitional attributes associated with the publisher (micro)service 511, 513, 515, 517, and/or 519 and the subscriber (micro)services 531, 533, 535, 537, and/or 539. Processor 521 is further configured to validate the received event includes the set of required definitional attributes and to process the event if the received event is validated.

Processor 521 is also configured to update the event to include at least a timestamp. Processor 521 is further configured to update the queue with the queue entry for each of the at least one recipient (micro)services 531, 533, 535, 537, and/or 539 for the event, wherein the priority is at least partially determined based on the timestamp.

Processor 521 is also configured to identify a maximum number of event transmission attempts. Processor 521 also attempts to transmit the event to each of the at least one recipient (micro)services 531, 533, 535, 537, and/or 539 until a transmission confirmation message associated with the transmission is received from the at least one recipient (micro)service. Processor 521 is also configured to determine that the maximum number of event transmission attempts has been met and wait a predetermined period before continuing to attempt to transmit the event. This example (of waiting in the event of failed retry) allows the events platform to conserve resources where a subscriber (micro)service is temporarily unavailable. In some examples, the predetermined period is set specific to an event type. In at least some examples, the predetermined period is one, two, three, four, five, or ten minutes. In other examples, any appropriate length of time may be used as the predetermined period.

Processor 521 is further configured to process the event to identify a group of recipient microservice from the at least one subscriber microservices 531, 533, 535, 537, and/or 539 and to attempt to simultaneously transmit the event to each of the group of recipient (micro)services 531, 533, 535, 537, and/or 539.

Figure 6:
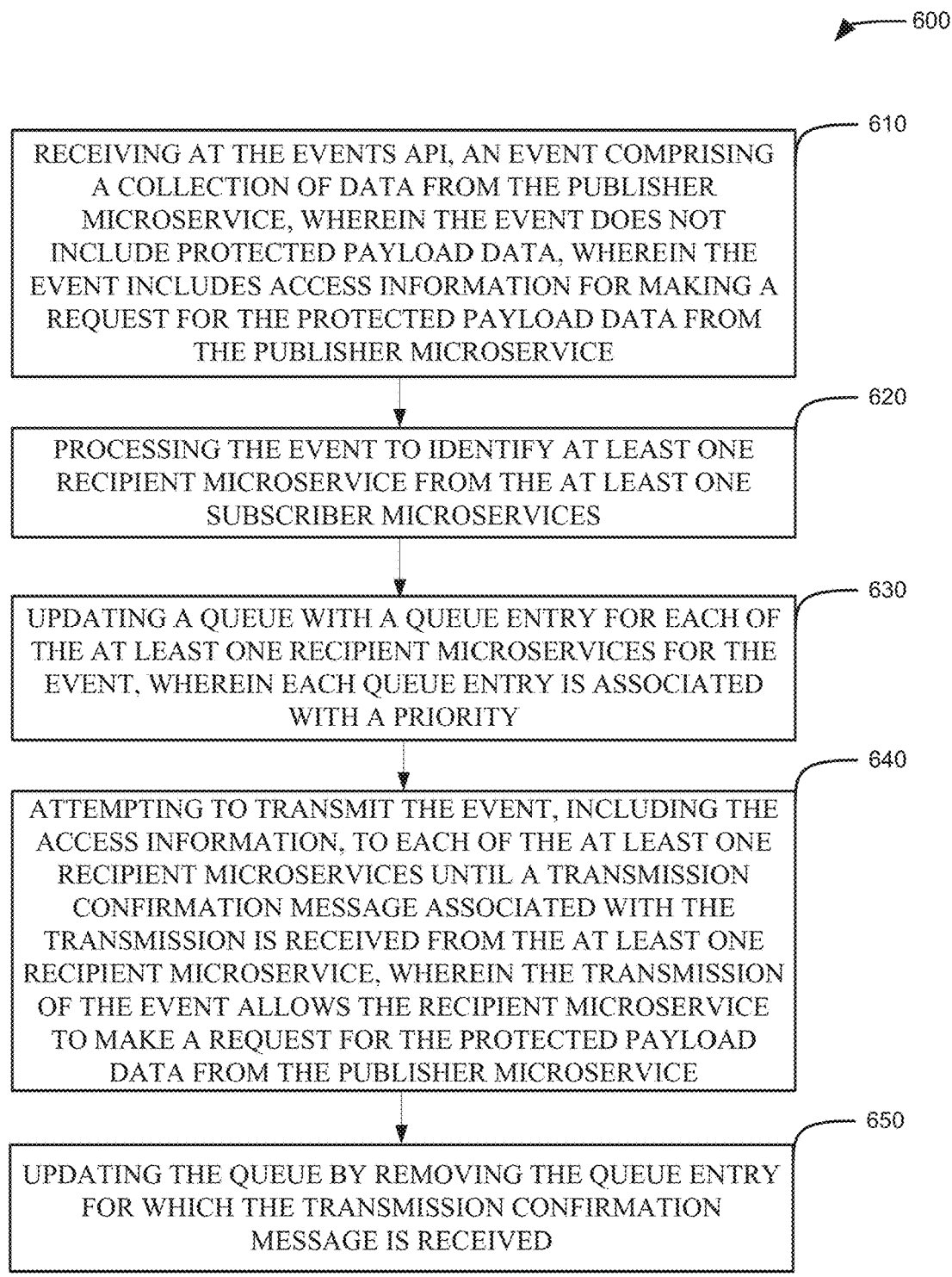
FIG. 6 is a flow diagram representing a method for providing resilient message processing using asynchronous communications performed by the event processing device of the event processing system shown in FIG. 5.

FIG. 6 is a flow diagram representing a method 600 for providing resilient message processing using asynchronous communications performed by the event processing device of the event processing system 500 (shown in FIG. 5). Specifically, event platform device 520 is configured to receive 610 (at the events API) an event comprising a collection of data from the publisher microservice, wherein the event does not include protected payload data, wherein the event includes access information used to allow the at least one recipient (micro)service to request protected payload data from the publisher (micro)service. Event platform device 520 is also configured to process 620 the event to identify at least one recipient microservice from the at least one subscriber microservices. Event platform device 520 is further configured to update 630 a queue with a queue entry for each of the at least one recipient microservices for the event, wherein each queue entry is associated with a priority. Event platform device 520 is also configured to attempt to transmit 640 the event to each of the at least one recipient microservices until a transmission confirmation message associated with the transmission is received from the at least one recipient microservice. (The term "attempt" is used because, as described, not all communications will be successful. As such, in most embodiments the event platform device 520 is configured to retry pursuant to the appropriate protocols until the transmission completes.) Event platform device 520 is further configured to update 650 the queue by removing the queue entry for which the transmission confirmation message is received.

Figure 7:
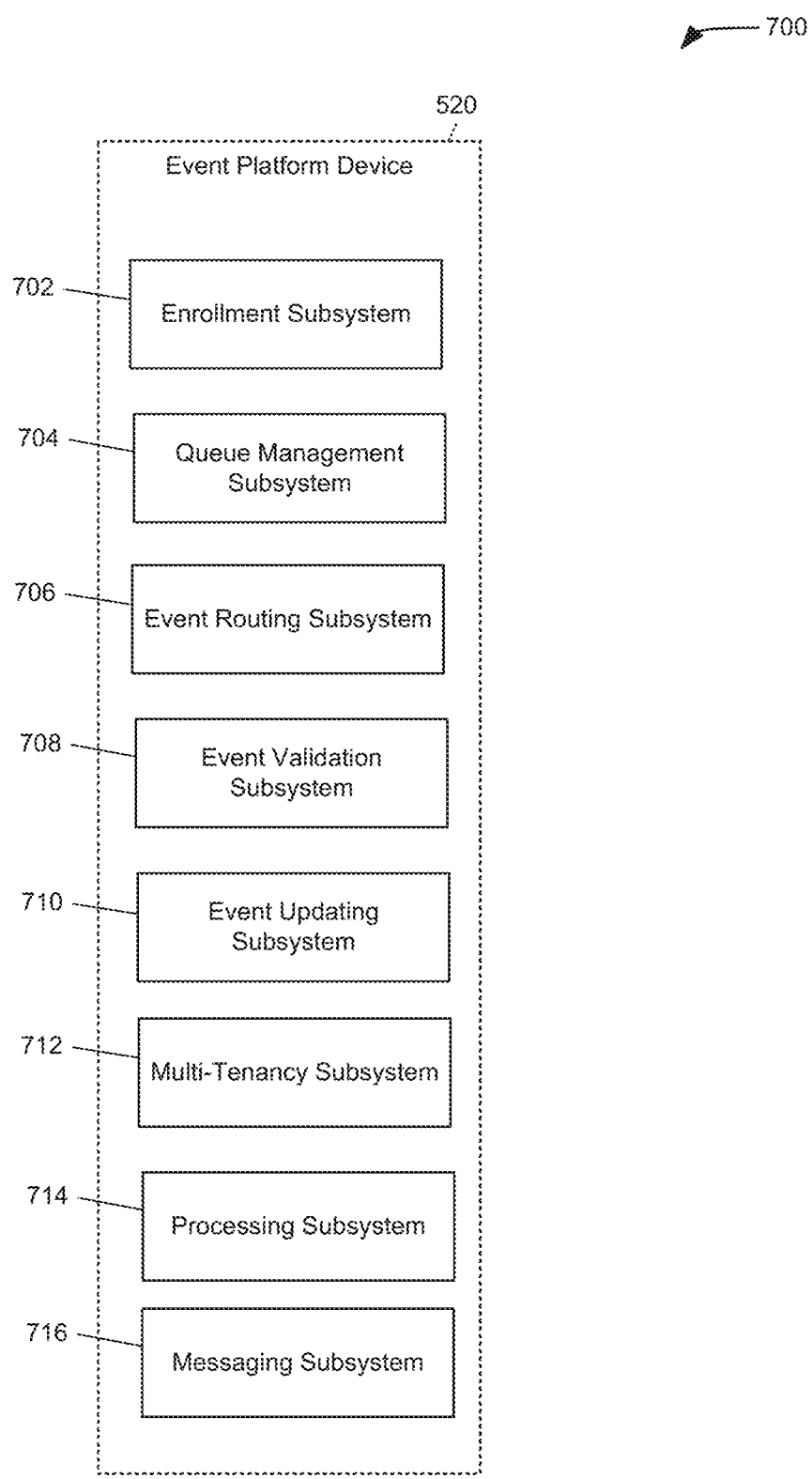
FIG. 7 is a diagram of elements of one or more example computing devices that may be used in the system shown in FIGS. 1-5.

FIG. 7 is a diagram of elements of one or more example computing devices that may be used in the system shown in FIGS. 1-5. As described herein, the elements 702, 704, 706, 708, 710, 712, and 714 are configured to perform the processes and methods described herein. Enrollment subsystem 702 is used to provide enrollment of subscribers and publishers and to establish the event communication protocols and procedures for particular subscribers and publishers. Queue management subsystem 704 is used to define, manage, increment, and decrement the queues described. Event routing subsystem 706 is used to process inbound events from publishers and to identify recipient subscriber(s) based on event information (i.e., in definitional attributes) and enrollment information. Event validation subsystem 708 is used to process events and confirm that they include all expected elements (i.e., necessary definitional attributes, payload structure, and naming structure). Event updating subsystem 710 is used to process and update inbound events (from publishers or subscribers) as described herein to include, for example, timestamps. Multi-tenancy subsystem 712 is used to facilitate the multi-tenancy models described. Processing subsystem 714 is used to provide the event processing functions described herein and messaging subsystem 716 is used to define the messaging functions described including creating and processing receipt confirmation messages and transmission confirmation messages.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An event processing system for providing resilient message processing using asynchronous communications comprising:
   a publisher microservice;
   at least one subscriber microservice; and
   an event processing device including a processor and a memory, said event processing device is in communication with the publisher microservice and the at least one subscriber microservice, wherein the event processing device includes an events API, wherein the processor is configured to:
      receive, at the events API, an event comprising a collection of data from the publisher microservice,;
      process the event to identify at least one recipient microservice from the at least one subscriber microservices;
      update a queue with a queue entry for each of the at least one recipient microservices for the event;
      attempt to transmit the event to each of the at least one recipient microservices until a transmission confirmation message associated with the transmission is received from the at least one recipient microservice; and
      update the queue based, at least in part, on receipt of the transmission confirmation message.

2. The event processing system of claim 1, wherein the processor is further configured to:
   request protected payload data from the publisher microservice; and
   transmit a receipt confirmation message to the publisher microservice upon receiving the event.

3. The event processing system of claim 1, wherein the processor is further configured to:
   receive enrollment definitions from the publisher microservice and each subscriber microservice;
   identify routing rules based on the enrollment definitions; and
   process the event to identify at least one recipient microservice from the at least one subscriber microservices based at least partially on the routing rules.

4. The event processing system of claim 3, wherein the processor is further configured to:
   identify a set of required definitional attributes associated with the publisher microservice and the subscriber microservices;
   validate the received event includes the set of required definitional attributes; and
   process the event if the received event is validated.

5. The event processing system of claim 1, wherein the processor is further configured to:
   update the event to include at least a timestamp; and
   update the queue with the queue entry for each of the at least one recipient microservices for the event, wherein each queue entry is associated with a priority, and wherein the priority is at least partially determined based on the timestamp.

6. The event processing system of claim 1, wherein the processor is further configured to:
   identify a maximum number of event transmission attempts;
   attempt to transmit the event to each of the at least one recipient microservices until a transmission confirmation message associated with the transmission is received from the at least one recipient microservice;
   determine that the maximum number of event transmission attempts has been met; and
   wait a predetermined period before continuing to attempt to transmit the event.

7. The system of claim 1, wherein the processor is further configured to:
   process the event to identify a group of recipient microservices from the at least one subscriber microservices; and
   attempt to simultaneously transmit the event to each of the group of recipient microservices.

8. An event processing device including a processor and a memory, the event processing device is in communication with a publisher microservice and at least one subscriber microservice, wherein the event processing device includes an events API, wherein the processor is configured to:
   receive, at the events API, an event comprising a collection of data from the publisher microservice;
   process the event to identify at least one recipient microservice from the at least one subscriber microservices;
   update a queue with a queue entry for each of the at least one recipient microservices for the event;
   attempt to transmit the event to each of the at least one recipient microservices until a transmission confirmation message associated with the transmission is received from the at least one recipient microservice; and
   update the queue based, at least in part, on receipt of the transmission confirmation message.

9. The event processing device of claim 8, wherein the processor is further configured to:
   request protected payload data from the publisher microservice; and
   transmit a receipt confirmation message to the publisher microservice upon receiving the event.

10. The event processing device of claim 8, wherein the processor is further configured to:
    receive enrollment definitions from the publisher microservice and each subscriber microservice;
    identify routing rules based on the enrollment definitions; and
    process the event to identify at least one recipient microservice from the at least one subscriber microservices based at least partially on the routing rules.

11. The event processing device of claim 10, wherein the processor is further configured to:
    identify a set of required definitional attributes associated with the publisher microservice and the subscriber microservices;
    validate the received event includes the set of required definitional attributes; and
    process the event if the received event is validated.

12. The event processing device of claim 8, wherein the processor is further configured to:
    update the event to include at least a timestamp; and
    update the queue with the queue entry for each of the at least one recipient microservices for the event, wherein each queue entry is associated with a priority, and wherein the priority is at least partially determined based on the timestamp.

13. The event processing device of claim 8, wherein the processor is further configured to:
    identify a maximum number of event transmission attempts;
    attempt to transmit the event to each of the at least one recipient microservices until a transmission confirmation message associated with the transmission is received from the at least one recipient microservice;
    determine that the maximum number of event transmission attempts has been met; and
    wait a predetermined period before continuing to attempt to transmit the event.

14. The event processing device of claim 8, wherein the processor is further configured to:
    process the event to identify a group of recipient microservices from the at least one subscriber microservices; and
    attempt to simultaneously transmit the event to each of the group of recipient microservices.

15. A method for providing resilient message processing using asynchronous communications, the method performed by an event processing device including a processor and a memory, the event processing device is in communication with a publisher microservice and at least one subscriber microservice, wherein the event processing device includes an events API, the method comprising:
    receiving, at the events API, an event comprising a collection of data from the publisher microservice;
    processing the event to identify at least one recipient microservice from the at least one subscriber microservices;
    updating a queue with a queue entry for each of the at least one recipient microservices for the event;
    attempting to transmit the event to each of the at least one recipient microservices until a transmission confirmation message associated with the transmission is received from the at least one recipient microservice; and
    updating the queue based, at least in part, on receipt of the transmission confirmation message.

16. The method of claim 15, further comprising:
    requesting protected payload data from the publisher microservice; and
    transmitting a receipt confirmation message to the publisher microservice upon receiving the event.

17. The method of claim 15, further comprising:
    receiving enrollment definitions from the publisher microservice and each subscriber microservice;
    identifying routing rules based on the enrollment definitions; and
    processing the event to identify at least one recipient microservice from the at least one subscriber microservices based at least partially on the routing rules.

18. The method of claim 17, further comprising:
    identifying a set of required definitional attributes associated with the publisher microservice and the subscriber microservices;
    validating the received event includes the set of required definitional attributes; and
    processing the event if the received event is validated.

19. The method of claim 15, further comprising:
    updating the event to include at least a timestamp; and
    updating the queue with the queue entry for each of the at least one recipient microservices for the event, wherein each queue entry is associated with a priority, and wherein the priority is at least partially determined based on the timestamp.

20. The method of claim 15, further comprising:

identifying a maximum number of event transmission attempts;

attempting to transmit the event to each of the at least one recipient microservices until a transmission confirmation message associated with the transmission is received from the at least one recipient microservice;

determining that the maximum number of event transmission attempts has been met; and wait a predetermined period before continuing to attempt to transmit the event.

* * * * *

UNITED STATES PATENT AND TRADEMARK OFFICE
CERTIFICATE OF CORRECTION

| | |
|---|---|
| PATENT NO. | : 11,516,306 B2 |
| APPLICATION NO. | : 17/577287 |
| DATED | : November 29, 2022 |
| INVENTOR(S) | : Johnu Celestine et al. |

It is certified that error appears in the above-identified patent and that said Letters Patent is hereby corrected as shown below:

In the Specification

In Column 5, Line 50 replace "PIP" with -- PII --

Signed and Sealed this
Sixteenth Day of May, 2023

Katherine Kelly Vidal
*Director of the United States Patent and Trademark Office*